(12) United States Patent
Proulx et al.

(10) Patent No.: US 6,913,786 B2
(45) Date of Patent: Jul. 5, 2005

(54) LAMINATED EDGE FILTER STRUCTURE AND METHOD OF MAKING

(75) Inventors: Stephen Proulx, Boxboro, MA (US); David DeCoste, Chelmsford, MA (US); Frank Lentine, Bedford, MA (US); Mark Carroll, Londonderry, NH (US); Brian Pereira, Salem, NH (US); George Perivolotis, Littleton, MA (US); John Leonard Burns, Jr., Dracut, MA (US)

(73) Assignee: Millipore Corporation, Billerica, MA (US)

( * ) Notice: Subject to any disclaimer, the term of this patent is extended or adjusted under 35 U.S.C. 154(b) by 0 days.

(21) Appl. No.: 10/837,768

(22) Filed: May 3, 2004

(65) Prior Publication Data

US 2004/0200771 A1 Oct. 14, 2004

Related U.S. Application Data

(62) Division of application No. 10/156,894, filed on May 29, 2002.
(60) Provisional application No. 60/301,930, filed on Jun. 29, 2001.

(51) Int. Cl.[7] ................................................. B05D 5/00
(52) U.S. Cl. ..................... 427/209; 427/211; 264/176.1; 264/177.1; 156/244.11
(58) Field of Search .................... 210/500.27, 493.1, 210/321.77; 264/176.1, 177.1; 427/210, 211, 322; 156/540, 167, 242, 243; 428/355 R

(56) References Cited

U.S. PATENT DOCUMENTS

| 3,407,252 | A | * | 10/1968 | Pall et al. ..................... 264/131 |
| 4,392,958 | A | | 7/1983 | Ganzi et al. |
| 4,512,892 | A | | 4/1985 | Ganzi et al. |
| 4,906,371 | A | | 3/1990 | Miller et al. |
| 4,929,354 | A | | 5/1990 | Meyering et al. |
| 4,969,997 | A | * | 11/1990 | Kluver et al. .......... 210/321.61 |
| 4,994,879 | A | | 2/1991 | Hayashi et al. |
| 5,762,796 | A | * | 6/1998 | Zraik ....................... 210/493.1 |
| 6,186,341 | B1 | | 2/2001 | Konstantin et al. |
| 6,632,522 | B1 | * | 10/2003 | Hyde et al. ............. 428/355 R |

FOREIGN PATENT DOCUMENTS

WO    WO 96/14913    5/1996

* cited by examiner

Primary Examiner—Ana Fortuna
(74) Attorney, Agent, or Firm—John Dana Hubbard

(57) ABSTRACT

The present invention relates to a filter element having a non-porous extrusion laminated strip formed on at least one edge and at least one side of a membrane. The strip is used to provide a means for ensuring a good bond between the filter element and the material into which it is potted. The strip is formed by the use of one or more extrusion heads that apply molten or softened polymer to one or both of the surfaces of the filter in a width and height desired. The strip is then subjected to pressure such as through a nip to at least partially embed the polymer strip into the filter pores so as to create a strong mechanical bond between the strip and the filter element. Additionally, it allows for the simultaneous formation of more than one membrane with the edge lamination at the same time.

5 Claims, 7 Drawing Sheets

LAMINATED EDGE FILTER STRUCTURE AND METHOD OF MAKING

Divisional of prior application Ser. No. 10/156,894 filed May 29, 2002 which claims the benefit of U.S. provisional app. No. 60/301,930, filed Jun. 29, 2001.

The present invention relates to a laminated edge construction for a filter and a method of making it. More particularly, it relates to the use of an extrusion lamination process to form one or more sealed edges on one or more layers of filter in order to form an integrally sealed filter in a cartridge device.

BACKGROUND OF THE INVENTION

Filter media are available in a variety of materials, typically natural or synthetic polymers. The media is typically in the form of a sheet. Often this sheet is pleated to increase the amount of surface area in a given device. The side edges and ends are then sealed. The ends are typically potted into end caps that are then bonded to cartridge housings to complete the device. The ends are commonly sealed into the end caps by the use of liquid sealers such as epoxy or polyurethane, molten thermoplastics, and the like.

The sheets are thin fibrous or cast porous membranes that have about 50 to 80% of their volume in the form of voids that form the pores of the structure. Such membranes are relatively weak and fragile especially when pleated. Coarser, highly permeable layers on one or both sides of the membrane are often used to support the membrane and to maintain flow channels between the pleated plies of the membrane.

Most often, the membrane material and the potting material and/or end cap material are dissimilar. Polypropylene is a widely accepted and used material for the end cap and potting material while membranes are formed of a variety of polymers such as PVDF, nylons, PTFE, PES and other polysulphones, and the like. Because of this dissimilarity between the polymers of the different components, the membranes do not seal well to the potting materials.

The use of intermediate layers between the membrane and the potting materials is well known in order to establish a good seal. The use of epoxies and polyurethanes have been tried as well as the suggestion to use injection molding of the membrane in place in the cap. Most commonly, one uses a non-porous film laminated to the edge to form the intermediate area.

For example U.S. Pat. Nos. 4,392,958 and 4,512,892 teach the use of a separate, self-supporting, integral, non-porous film layer welded to the edges of the ends of the membrane through the use of pressure and/or heat or solvents. The film reinforces the edge and allows for a good bond between the membrane and the end sealing or potting material.

U.S. Pat. Nos. 4,929,354 and 4,906,371 teach rendering the end portions of the membrane non-porous, either by compression/heat of the edge portion of the membrane or by casting such a portion simultaneously adjacent the membrane to form an integral, non-porous edge portion. Also disclosed is a heat-sealing method in which a preformed tape with a polyethylene hot melt adhesive adheres a nylon membrane to the endcap. The process uses "heat shoes" to preheat the tape in preparation of bonding.

For use in sterilizing liquids, the completed filters are tested for integrity prior to and often after use. This is done in a variety of ways, most commonly by filling the membrane pores with a liquid such as water and measuring the flow rate of a gas, typically air through the membrane under a pressure which is a substantial portion of the membrane bubble point, for example 80% of the bubble point. For a given membrane, the bubble point and diffusion rates are known. If the measured flow is negligible, then the filter is considered to be integral. If the flow exceeds a set level, the filter fails the test. Ordinarily the higher airflow is attributed to a physical defect in the filter such as a tear, pinhole, crack, bad seal or other such large opening. However in many cases, the filter upon closer, destructive examination, such as SEM analysis, shows the device did not have a physical defect that caused the higher than allowed air flow.

The most often used membranes are hydrophilic, either those that are hydrophilic inherently or most commonly by some surface treatment means such as by coating and/or cross linking a hydrophilic coating to the surfaces of the membrane or grafting the philic functionality into the membrane surface or incorporating a hydrophilic material into the membrane material before it is made.

It is recognized in the art that any potting which involves heating of a membrane that has been rendered hydrophilic before potting may cause the hydrophilic areas under the potting material and/or adjacent to it to be weakened or lost. (See U.S. Pat. No. 4,929,354 and WO 96/14913).

This can cause several problems. First, the loss of hydrophilicity reduces the effective amount of area that a given membrane has for filtration of philic liquids. Lastly, and most importantly, this appears to interfere with the ability of the filter to pass the commonly used integrity test.

One theory is that the areas that have the loss or reduction of the philic coating revert to being hydrophobic and don't wet out completely. This allows air or the gas used in the integrity test to flow more readily on an order that typically would be considered as an indication of a physical defect. Thus, integral filters with no physical defects but some hydrophobic areas cannot be distinguished from philic filters that have physical defects such as defective seals or tears and are therefore rejected unnecessarily.

WO96/14913 suggests overcoming this issue by treating the membrane with the hydrophilic agent after either laminating a non-porous tape to the edge areas or collapsing and densifying the edge areas to render them impervious to air.

U.S. Pat. No. 6,186,341 suggests bonding a preformed thermoplastic fibrous mat along the edge of the membrane before the membrane is sealed into a thermoplastic resin which holds the membrane and cartridge pieces together. The potting material of the end cap enters the fibrous layers to form a seal with the endcap. It is stated that this method avoids the denaturing of a hydrophilic coating of the membrane in the edge area.

SUMMARY AND OBJECTS OF THE INVENTION

The present invention relates to a filter element having a non-porous extrusion laminated strip formed on at least one edge of the membrane, preferably on both the top and bottom edges of the membrane and on at least one surface. The strip is used to provide a means for ensuring a good bond between the filter element and the material into which it is potted. The strip is formed by the use of one or more extrusion heads arranged adjacent to one or both of the surfaces of the filter to which it is applied. Softened, preferably, molten polymer is applied through a die in each head to form a strip on the surface of the filter in a width and height desired. The strip is then subjected to pressure such as through a nip to at least partially embed the polymer strip into the filter pores so as to create a strong mechanical bond between the strip and the filter element.

The present invention provides a product and process for making the product which allows for the formation of a sealing edge on a membrane that is integral and allows for a solid seal between the membrane and the potting material of the cartridge or capsule into which it is sealed. Additionally, it forms the edge without disrupting the hydrophilic coating in the edge area (if used). Moreover, it allows for the simultaneous formation of more than one membrane with the edge lamination at the same time and of the same of varying widths. Further, the invention provides for the use of multiple layers of membrane being sealed in the same edge material. Either by the use of one strip of material or by the use of multiple layers of strip material formed into a single edge piece.

IN THE DRAWINGS

DETAILED DESCRIPTION OF THE INVENTION

Figure 1:
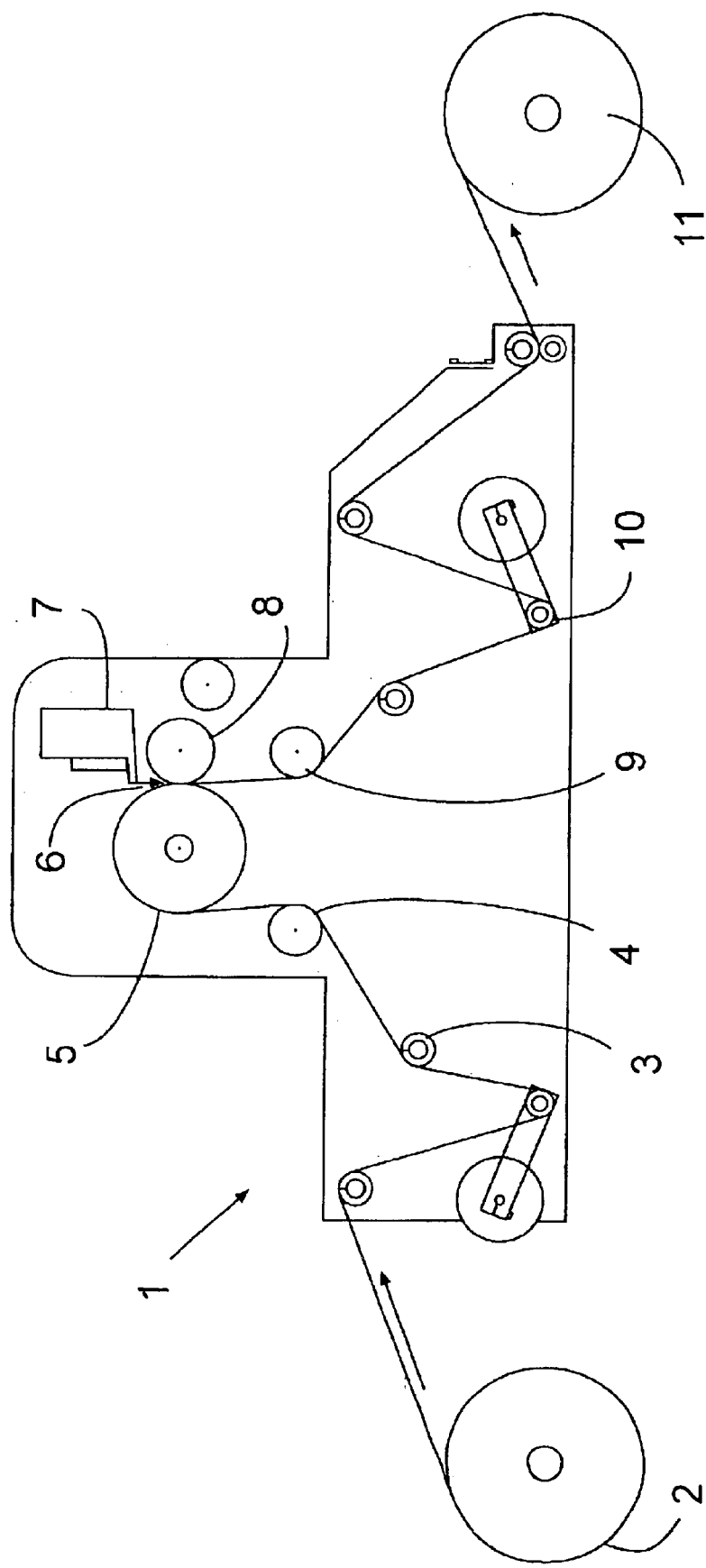
FIG. 1 shows a device useful in forming the extrusion-laminated strip of the present invention in planar view.

FIG. 1 shows a machine 1 and process for forming the extrusion lamination of the present invention. The machine 1 has a roll of membrane 2 to which the extrusion strip is applied. The membrane 2 is wound over one or more tension rollers 3 and guide rollers 4 to a lamination roll 5. One or more strips of heated, preferably molten plastic material 6 is forced through an extrusion die 7 onto one or more selected portions of the membrane surface and the one or more strips 6 are at least partially embedded into the membrane 2 by pressure such as by the nip roller 8 located adjacent to the lamination roller 5. From there, the membrane is wound past one or more guide rollers 9 and tension roll 10 to a wind up roll 11.

The laminator and nip roll system applies a controlled temperature and pressure to the membrane and one or more extruded strips.

Die design is such that it preferably forms a relatively flat strip of a dimension that is determined by die geometry. Other shapes, such as half round, half oval etc, may be used so long as it does not interfere with either the further processing steps on the machine, cutting or pleating of the finished membrane or the sealing of the membrane into the end caps. Dimensions of the applied strip are adjusted by the die position, extruder output and line speed. One can change the dimensions of the one or more strips by simply varying any one or more of these variables.

As discussed above, one or more strips maybe applied simultaneously to the membrane surface. As most membranes are cast at relatively large widths, typically one foot to four feet (30 to 121 cm), the membrane must be slit to the desired size, typically 2, 4, 8, 10 or 12-inch widths (5, 10, 20, 25, 30 cm) to correspond the desired height of the cartridge. This may be done before the edge lamination is formed or after. The present invention allows one to simultaneously apply one, two or more strips for the same sized widths or if desired, different sized widths on the same piece of membrane before slitting. As the application of the strip is a more labor and energy-intensive step and every time one slits a membrane, one looses some membrane material as scrap along the edge, the present process of the present invention provides one with a cost and time saving advantage. It also allows one to optimize the use of the membrane roll by applying as many strips as are needed to form the desired widths. At the present time, applicants have simultaneously applied up to six strips of the same or different dimensions to a web of membrane and have arranged the strips at various widths from 2 to 10 inches (5 to 25.4 cm). More or less strips are easily accomplished with the present invention.

Preferably, when two or more devices are to be made from the same web of material, at least the center strip is extruded in a width nearly equal to twice that of the finished strip width so that finished dimension of the membrane is made by simply cutting down the middle of the center strip. The outer strips may be of the correct size or they may be the same size as the center strip and the outer edges are trimmed before assembly of the filter. For example, one can form from a single 24 inch (60.96 cm) width sheet of membrane, several filter sizes, such as a 2 inch (5 cm) or 4 inch (10 cm) wide device useful in filtration capsules or an 8 (20 cm), 10 (25.4 cm), or 12 inch (30.48 cm) wide device typically used in cartridges for filtration and various combinations thereof.

In either embodiment above, the strip(s) may be applied to one side of the membrane or both, to one peripheral edge of the membrane or both as is desired. Preferably, it is applied to at least one side on both peripheral edges of the membrane that is to be used. More preferably, it is applied to both sides on both peripheral edges.

Strip material can be made from any material that is commonly used today for such bonding applications, such as polyethylene, polypropylene, PVDC, EVA copolymers, polyamides, acrylics, methacrylics, perfluorinated thermoplastics such as PFA resin and even PTFE. The selected material should be compatible with filter housing material to form the liquid tight seal. As most housing materials are formed of polypropylene, polypropylene or polyethylene are the preferred materials for the extrusion-laminated strip. Strip material made of the same polymer as the membrane is not necessary with the present invention. This is possible because the bond is mechanically interlocking in nature. The bond is impervious and pressure resistant. It is preferred that the strip material is similar to the housing material rather than the membrane material. The use of dissimilar materials for the strip and the membrane is acceptable and even preferred and yet a strong mechanical bond between the membrane and the strip is achieved and a strong bond between the housing and the strip is also achieved.

The extruded strip material can also be colored with pigments to easily identify one membrane or cartridge product from another. Food grade pigments are commercially available.

It is preferred that the process temperature of the strip material is below the distortion temperature of the membrane or the surface treatment (such as the hydrophilic coating), if used. In this way, the application of the strip does not harm the structural integrity of the membrane or the surface coating.

In a preferred embodiment, the strip material is selected of a material having a process temperature below the distortion point of the membrane and surface treatment materials, if present. Such materials are well known in the industry and are typically found in polyethylenes, polypropylenes and PFAs (also referred to as thermoplastic perfluoropolymers or thermoplastic PTFEs, often used with PTFE membranes and devices as they are processible like a thermoplastic polyolefin, yet are compatible with and similarly inert as the PTFE materials.). For example, one can use a low melting PFA such as Hyflon® 940 AX resin, from Ausimont USA Inc of Thorofare, N.J. to form the strip especially on PFA and PTFE membrane edges. Polypropylene from Exxon Chemical and Montell USA Inc with melt index values from 5 to 30 can be used especially in bonding membranes such as PVDF or PES to polypropylene or other polyolefinic housing materials.

Pretreatment of the membrane surface with heat prior to lamination can be used. This reduces the quench rate of the extruded film, thus allowing for better surface coating and greater bond strength. This can be accomplished by the inclusion of heated rolls into the process, the use of a convection or radiant oven or tunnel or through the use of heat lamps and other such well-known means for heating a film stock or membrane. Adequate bond strength is necessary for the production of integral filter cartridges. Bond strength is determined by mechanically separating the membrane from the strip and pulling with force at a specific angle. Tensile pulling machines common to the Plastics Industry, such as Instron machines, are commonly used for bond strength testing. In some cases, the bond that is formed by the present invention is too great for mechanical separation. Other pretreatment methods include, but are not limited to corona discharge, ozone, plasma, laser, ultrasonic, and mechanical modifications such as abrasion and chemical etching to enhance the properties of the finished product.

Typically, a nip pressure in the range of 15 to 50 pli (pounds per linear inch) is applied. Less pressure prevents adequate surface contact with the membrane structure and therefore lower bond strength. Excessive nip pressure will crush the membrane structure in the edge areas that is not desirable.

Figure 2:
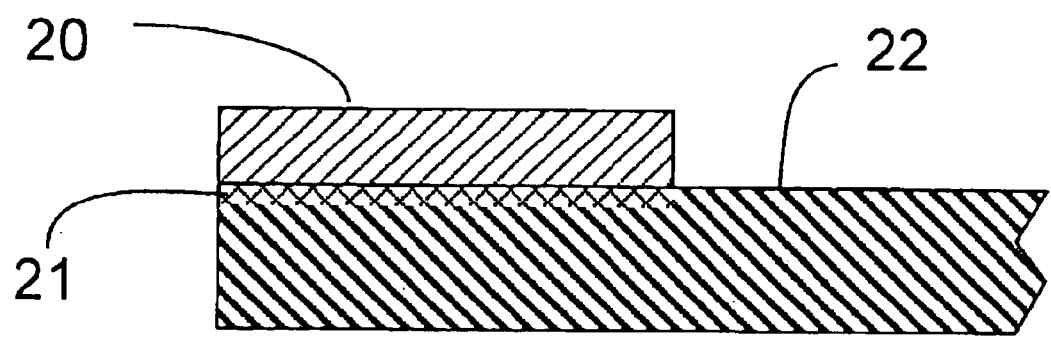
FIG. 2 shows a close-up cross-sectional view of a membrane having an extrusion-laminated strip along one of its edges.

FIG. 2 shows a close up cross section of a polypropylene strip 20 that has been extrusion laminated to the edge 21 of a membrane 22.

Figure 3:
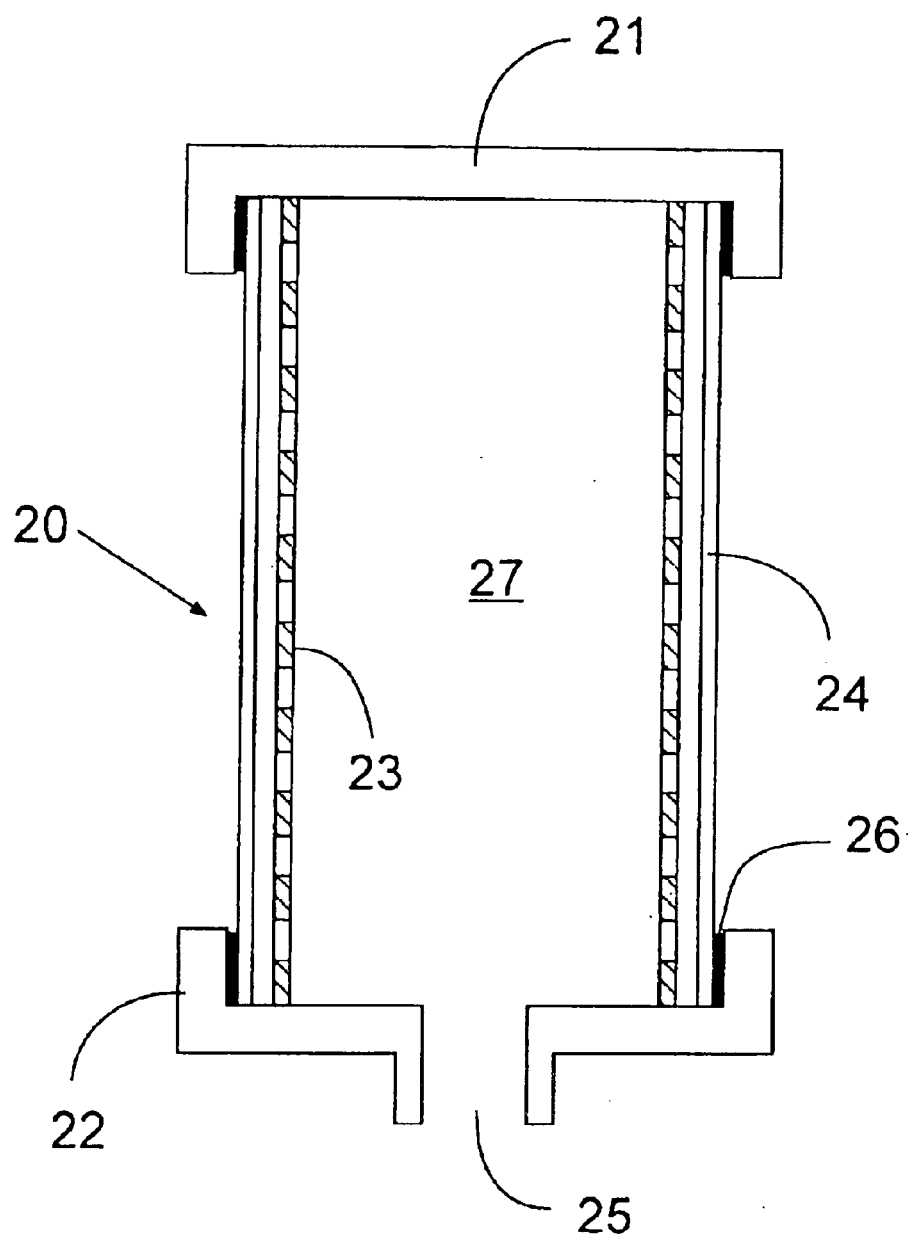
FIG. 3 shows a cross-sectional view of an assembled filter using the present invention.

FIG. 3 shows a filter cartridge incorporating the edge sealed membrane of the present invention. The cartridge 20, is formed of a first endcap 21, and second endcap 22, a porous core 23 and a membrane 24 according to the present invention. As can be shown in this drawing, there is an outlet 25 extending from the second endcap 22. The edge seals 26 are bonded to the first and second endcaps to form an integral, fluid tight seal between the edges of the membranes and the endcaps such that all fluid on the outside of the cartridge must pass through the membrane 24 before reaching the cartridge interior 27 or outlet 25.

The filter may be made of one or more membranes of any variety commonly used in filtering including but not limited to microporous membranes, ultrafiltration membranes, nanofiltration membranes, or reverse osmosis membranes. Preferably microporous membranes are used.

Representative suitable microporous membranes include nitrocellulose, cellulose acetate, polysulphones including polyethersulphone and polyarylsulphones, polyvinylidene fluoride, polyolefins such as ultrahigh molecular weight polyethylene, low density polyethylene and polypropylene, nylon and other polyamides, PTFE, thermoplastic fluorinated polymers such as poly (TFE-co-PFAVE), e.g. PFA, polycarbonates or particle filled membranes such as EMPORE® membranes available from 3M of Minneapolis, Minn. Such membranes are well known in the art, may be symmetrical or asymmetrical or a combination of the two and are commercially available from a variety of sources including Durapore® membranes and Express® membranes available from Millipore Corporation of Bedford, Mass.

Representative ultrafiltration or nanofiltrabon membranes include polysulphones, including polyethersulphone and polyarylsulphones, polyvinylidene fluoride, and cellulose. These membranes typically include a support layer that is generally formed of a highly porous structure. Typical materials for these support layers include various nonwoven materials such as spun bounded polyethylene or polypropylene, or glass or microporous materials formed of the same or different polymer as the membrane itself. Such membranes are well known in the art, and are commercially available from a variety of sources such as Millipore Corporation of Bedford, Mass.

The same process can be used to form multiple layers of porous filter material. This lamination technique and the resultant multilayered product overcomes the problem of cartridge integrity when one uses multiple filter layers sandwiched together. There are several multiple layer applications and their use is becoming more frequent, however, integrity at the endcap has been the major stumbling block to the use of these filters. Uses include incorporating layers of various porosity, various pore sizes, the inclusion of prefilter layers upstream of membrane layers and the use of several layers, one or more of which utilizes a different retention mechanisms (such as pore size, charge, phobicity/philicity, etc.).

The present invention can use a single strip to incorporate the multiple layers or if desired, one can use multiple layers of extrusion-laminated material to form the multiple layered structures.

Figure 4:
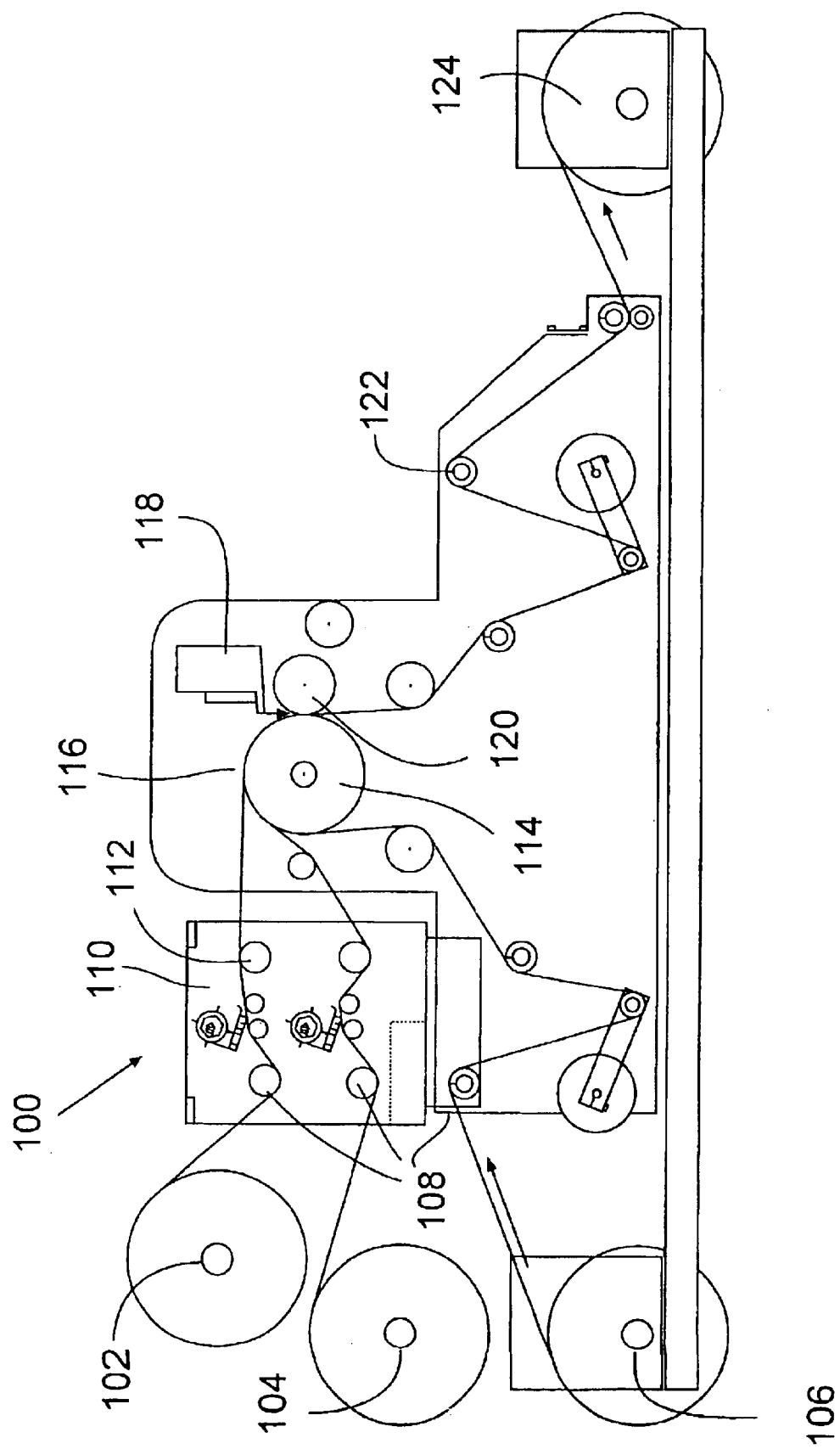
FIG. 4 shows a second embodiment a device useful in forming the extrusion-laminated strip of the present invention in planar view.

FIG. 4 shows an apparatus for the formation of the multiple layered structure and for conducting the process for making such a product. The lamination is accomplished by aligning previously slit porous substrates, such as membranes and prefilters, of different widths and conveying them to the extrusion nip roll. The widths of each layer are close enough in dimension so that a narrow extrusion lamination strip is formed and in contact with each layer so as to form an integral structure. Control of the machine direction alignment can be achieved through the use of tension on each layer of porous substrate in the machine.

As shown, the machine 100 has two or more rolls of membrane, in this example three rolls, 102, 104 and 106, are shown. The membranes 102, 104 and 106 are unwound under careful tension control over one or more tension rollers 108 to a slitting aligning station 110. From there, the membranes 102, 104 and 106 are fed past guide rollers 112 to a lamination roll 114. One or more strips of heated, preferably molten plastic material 116 is forced through one or more extrusion dies 118 located adjacent and preferably above the lamination roller 114 onto one or more selected portions of the membrane surfaces and the one or more strips are at least partially embedded into the membranes 102, 104 and 106 by the nip roller 120 located adjacent to the lamination roller 114. From there, the membrane is wound past one or more guide rollers 122 and to a tension controlled wind up roll 124.

As with the first embodiment using one layer of porous material, the strip(s) dimensions can be set by the die position, design, extruder output and line speed. Strip bond strength can be controlled by the temperature of the extrusion material and the membrane structure. The same membrane materials and strip materials used in the first embodiment can be used in this embodiment as well. The use of tension on each layer can vary from membrane type to membrane type, depending on line speed, relative alignment, relative flatness of the membrane selected and other such factors. One can easily adjust this parameter to ensure that a final structure of desired flatness between the layers is achieved.

Figure 5:
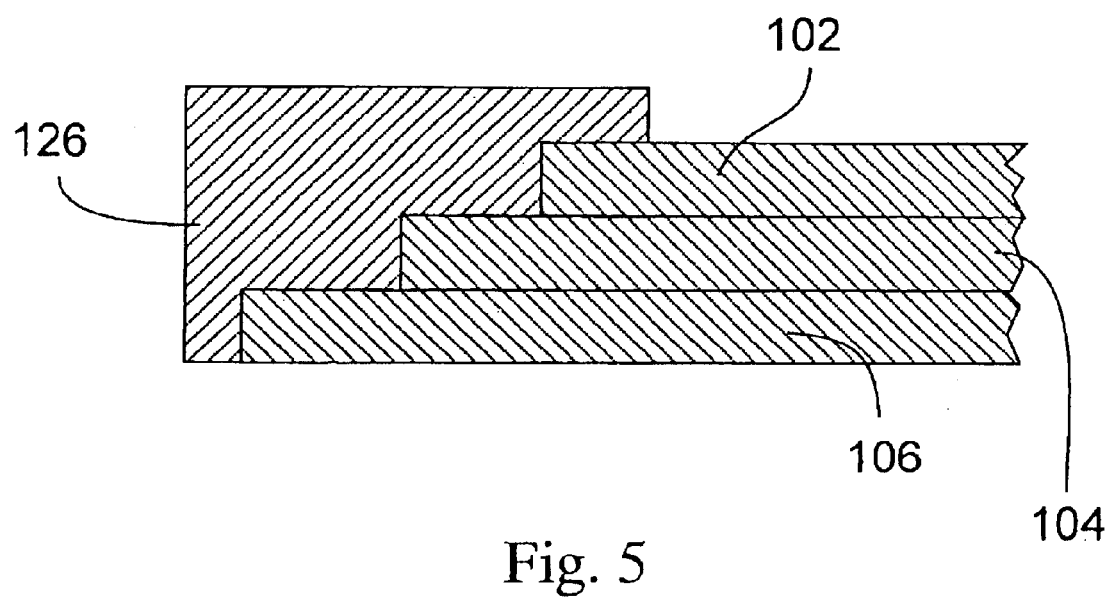
FIG. 5 shows a close-up cross-sectional view of three membranes having an extrusion-laminated strip along one of its edges.

FIG. 5 shows a cross section of a three membrane series containing the extrusion lamination strip of the present invention. As can be seen membranes 102, 104 and 106 are integrally sealed within the strip 126.

Alternatively, one can use more than one strip to form the same multiple layer structure. In this instance, the membranes do not need to be staggered and control of tension while still useful is less important. Additionally, the use of multiple extrusion dies arranged as desired to achieve the correct alignment of the strips and the proper sealing of them to the membranes and each other may be used.

If desired and as is preferred in this invention, membranes may have been treated to render them hydrophilic before application of the sealing edge. Such techniques are well known in the art and include but are not limited to grafting, crosslinking or simply polymerizing hydrophilic materials or coatings to the surfaces of the membranes, See for example U.S. Pat. No. 4,994,879 and WO96/14913.

Figure 6:
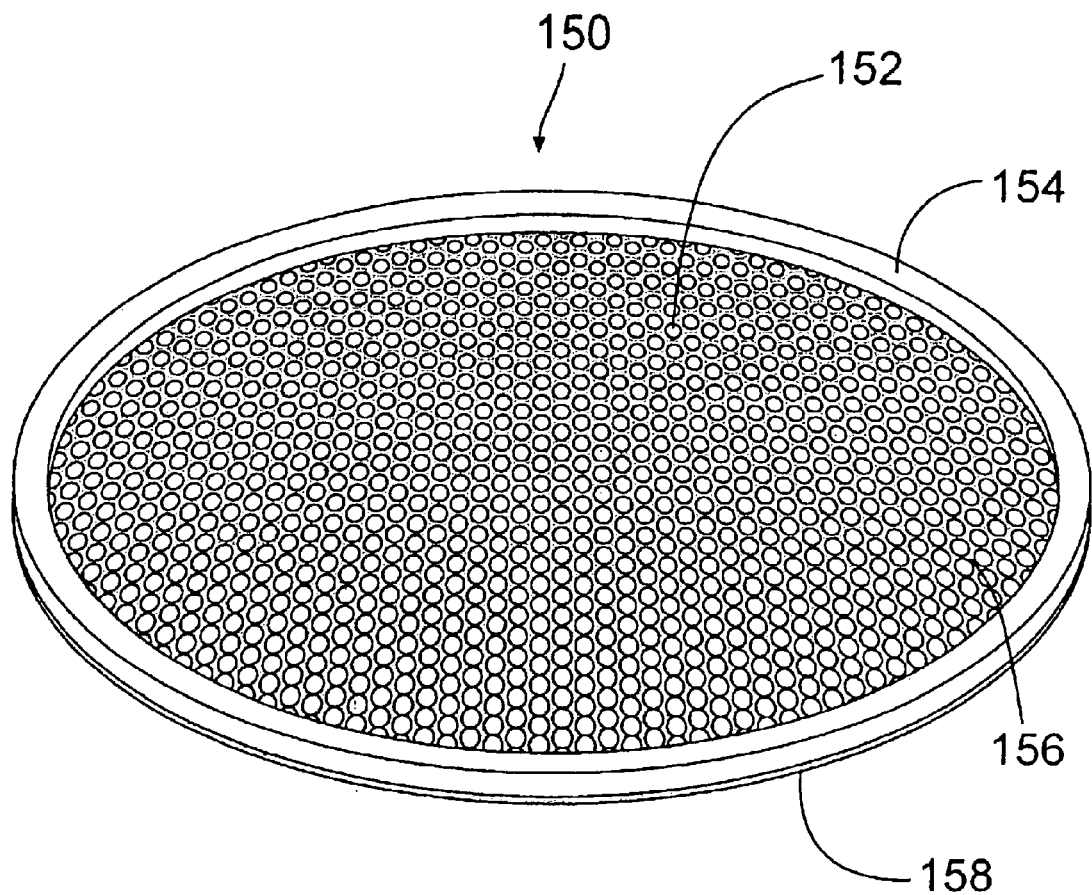
FIG. 6 shows a planar view of another embodiment of the present invention.

While this invention has been described in relation to rectangular shaped membranes (including square membranes), it may be used to form other shapes of membranes with a laminated edge. For example, circular shaped membranes or disks are widely used in some applications and the use of a laminated non-porous edge on the one lateral edge (either on one major surface or on both) would be advantageous in sealing the disk to its support structure (such as MILLIDISK® filters available from Millipore Corporation of Bedford, Mass.). Likewise, elliptical shaped membranes have also been used and the use of the present invention to provide a sealing rim would be helpful. The application of a laminated edge on other shapes (triangular, diamond and the like) would also be possible with the present invention. At least one lateral edge of at least one major surface contains the laminated edge of the present invention. FIG. 6 shows a planar view of a membrane 150 in the form of a circular disk 152 having a non-porous extruded film edge 154 of the present invention attached to the first major surface 156 of the lateral edge 158.

The extrusion equipment to make such nonlinear edges may need to be different than that shown with the preferred embodiments above. For example, the use of a series of circular dies of the correct diameter may be used and plastic material applied to the web of membrane as it passes below the dies as in a continuous or intermittent fashion. Alternatively, one could mount the extrusion die on an x/y table and apply the edges where and as needed to a section of membrane. In this embodiment the membrane may be in sheet form and the process is done in a batch fashion or it may be a continuous web of material to which the plastic is applied in a continuous or intermittent fashion.

EXAMPLE 1

Samples According to the Present Invention

Hydrophilic, PVDF membrane, known as Durapore® membrane available from Millipore Corporation of Bedford, Mass., was seated at its top and bottom edges on one side with an extrusion laminated strip of polypropylene and subsequently converted into pleated, 10 inch cartridges.

Control Samples

Hydrophilic, PVDF membrane, from the same manufacturing lot as the above samples was also heat laminated at the top and bottom edges of the membrane on one side, but with a preformed film of polypropylene. This structure was subsequently converted into pleated, 10-inch cartridges for comparison to the above samples.

Testing

Both sets of membrane were formed into 10 inch pleated cartridges formed of polypropylene nonwoven support, end caps and cages. All cartridges were formed in the same manner and under the same conditions.

All cartridges were subjected to a gas diffusion test in which cartridge integrity is measured. In practice, the cartridge is mounted in the proper housing and subjected to water flow sufficient for 100% wetting of all the membrane pores. While the pores are filled with water, a differential gas pressure is applied to the cartridge that allows the gas molecules to migrate through the pores. The flow rate of gas through the membrane is a measure of cartridge integrity.

The cartridges of the present invention had one failure that upon destructive examination was found to be due to an unseamed side seam pleat pack. The lamination and end cap seal in each end was completely integral.

Three of the control samples failed. All were do to end cap voids caused by inadequate heating between the end cap and the membrane.

Figure 7:
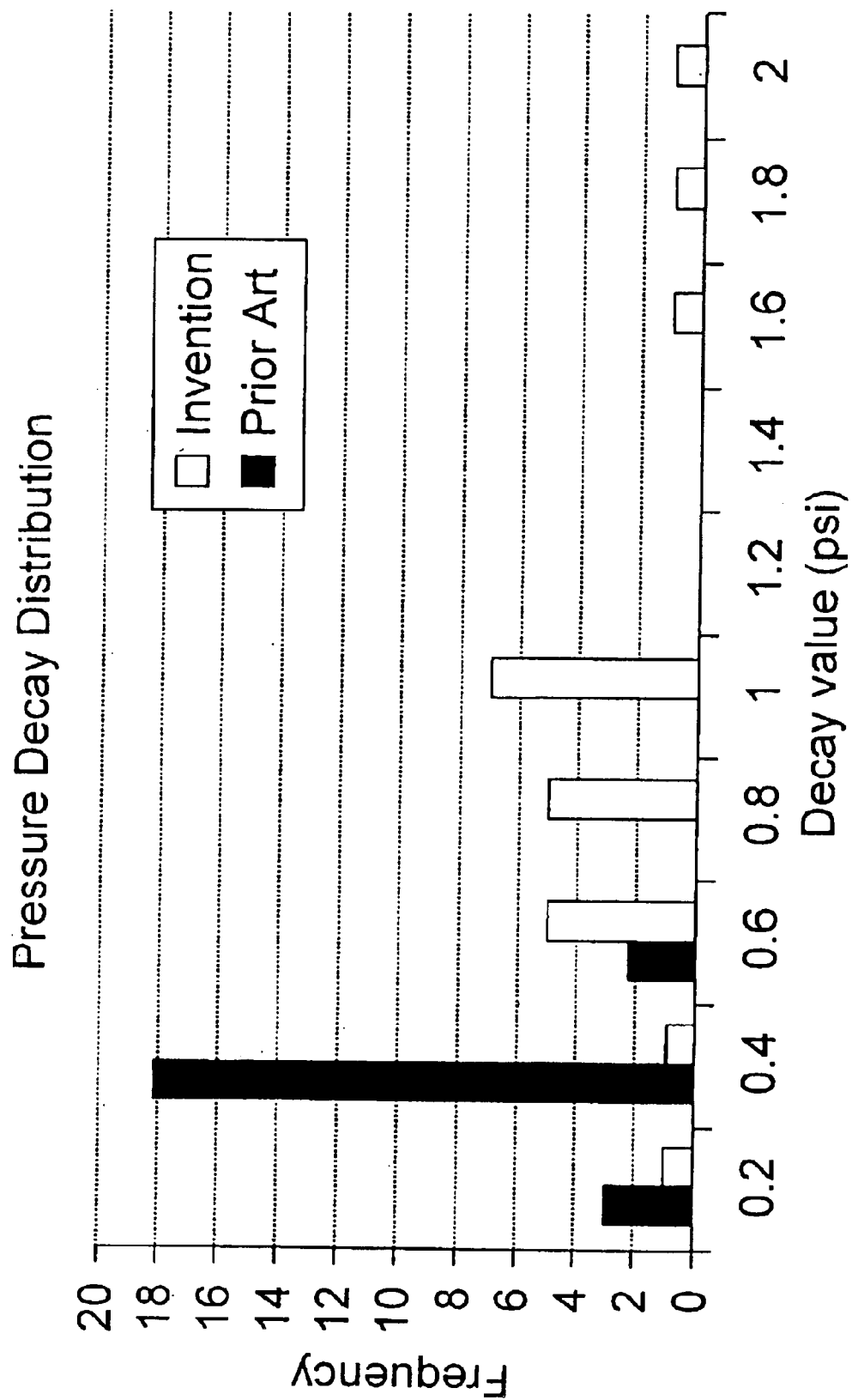
FIG. 7 shows the data generated from Example 1.

Ten sample of each were subjected to a bacterial retention test in accordance with ASTM F838-83. This is a destructive test that is correlated to the gas integrity test described above. Each sample was challenged with a solution of $1 \times 10^7$ colony forming units (CFU) per $cm^2$ of membrane area. The effluent of the filtration is then passed through an assay filter which will be incubated and CFU's counted. While all passed, the samples having the edge lamination of the present invention showed lower pressure decay over time when held at a constant pressure as compared to the sample of the prior art edge lamination. The data from this test is shown in FIG. 7. Lower pressure decay indicates a more integral cartridge.

What we claim:

1. A process for the formation of a sealing edge on a membrane comprising the steps of selecting a membrane, selecting a material for the sealing edge, heating the material to a temperature at or above its melting point and applying the sealing edge material to one or more portions of the membrane;

wherein the material is heated in an extruder and the material is applied to the membrane from an extrusion die of the extruder.

2. The process of claim 1 further comprising applying a pressure to the material after it has been applied to the one or more portions of the membrane.

3. The process of claim 1 wherein the material is heated in an extruder and the material is applied to the membrane from an extrusion die of the extruder wherein the die has two or more openings spaced apart from each other.

4. The process of claim 1 further comprising applying a pressure to the material after it has been applied to the one or more portions of the membrane and wherein the pressure is applied by one or more nip rollers.

5. The process of claim 1 wherein the material is partially embedded into the membrane.

* * * * *